US007099972B2

(12) United States Patent
Chao

(10) Patent No.: US 7,099,972 B2
(45) Date of Patent: Aug. 29, 2006

(54) PREEMPTIVE ROUND ROBIN ARBITER

(75) Inventor: Fu-Kuang Frank Chao, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 327 days.

(21) Appl. No.: 10/189,262

(22) Filed: Jul. 3, 2002

(65) Prior Publication Data

US 2004/0006662 A1  Jan. 8, 2004

(51) Int. Cl.
G06F 13/14 (2006.01)
G06F 13/16 (2006.01)
G06F 13/20 (2006.01)
G06F 13/36 (2006.01)
G06F 13/364 (2006.01)
G06F 13/374 (2006.01)

(52) U.S. Cl. .................. 710/118; 710/57; 710/112; 710/116; 710/241; 710/244

(58) Field of Classification Search ............... 710/111, 710/240–241, 244, 242–243, 57, 118
See application file for complete search history.

(56) References Cited

U.S. PATENT DOCUMENTS

| 5,084,841 | A | * | 1/1992 | Williams et al. | ....... | 365/189.07 |
| 5,564,062 | A | * | 10/1996 | Meaney et al. | ............. | 710/244 |
| 5,568,485 | A | * | 10/1996 | Chaisemartin | ............... | 370/462 |
| 5,815,674 | A | * | 9/1998 | LaBerge | ..................... | 710/107 |
| 5,819,052 | A | * | 10/1998 | Sonoda | ....................... | 710/113 |
| 5,870,560 | A | * | 2/1999 | Zulian | ......................... | 709/225 |
| 6,101,329 | A | * | 8/2000 | Graef | ........................... | 710/52 |
| 6,105,086 | A | * | 8/2000 | Doolittle et al. | .............. | 710/52 |
| 6,134,625 | A | * | 10/2000 | Abramson | .................. | 710/241 |
| 6,246,256 | B1 | * | 6/2001 | Liu et al. | ....................... | 326/38 |
| 6,420,901 | B1 | * | 7/2002 | Liu et al. | ....................... | 326/38 |
| 6,442,657 | B1 | * | 8/2002 | Fan et al. | .................... | 711/156 |
| 6,570,403 | B1 | * | 5/2003 | Liu et al. | ....................... | 326/38 |
| 6,629,220 | B1 | * | 9/2003 | Dyer | .......................... | 711/158 |
| 6,647,449 | B1 | * | 11/2003 | Watts | .......................... | 710/111 |
| 6,701,399 | B1 | * | 3/2004 | Brown | ....................... | 710/114 |
| 6,751,160 | B1 | * | 6/2004 | Murata | ....................... | 365/239 |
| 6,763,418 | B1 | * | 7/2004 | Chou et al. | .................. | 710/317 |
| 6,804,736 | B1 | * | 10/2004 | Olarig | ......................... | 710/240 |
| 6,880,028 | B1 | * | 4/2005 | Kurth | .......................... | 710/240 |
| 2001/0047446 | A1 | * | 11/2001 | Liu et al. | ..................... | 710/240 |
| 2002/0178311 | A1 | * | 11/2002 | Liu et al. | .................... | 710/240 |
| 2003/0177296 | A1 | * | 9/2003 | Kurth | .......................... | 710/244 |
| 2003/0229742 | A1 | * | 12/2003 | Moss | .......................... | 710/111 |

OTHER PUBLICATIONS

Free Online Dictionary of Computing; "queue", Free Online Dictionary of Computing; May 11, 1995.*

* cited by examiner

Primary Examiner—Paul R. Myers
Assistant Examiner—Ryan M. Stiglic
(74) Attorney, Agent, or Firm—Blakely, Sokoloff, Taylor & Zafman LLP

(57) ABSTRACT

A resource allocation arbitration system. The system includes a plurality of storage devices, a plurality of indicators, and a plurality of mask bits. Each storage device stores requests for resources. Each indicator enables indication of a condition in which the request stored in each storage device is almost empty. Furthermore, the mask bits enable preemption of one request by another request.

10 Claims, 2 Drawing Sheets

PREEMPTIVE ROUND ROBIN ARBITER

BACKGROUND

The invention relates to an arbitration circuit. More particularly, the invention relates to a preemptive round robin arbitration circuit.

When an asset or resource, such as a personal computer data bus, needs to be used by multiple requesters, such as a modem, a hard disk and/or a software program, some kind of allocation scheme needs to be provided. Hence, if no single asset or resource is in an extreme hurry, a round robin scheme may be used where, on a given clock cycle, one device request line is polled to ascertain whether or not that requester or device has a need for the asset. If there is a request, the request is granted for an appropriate amount of time. After that request is removed or finished, the system proceeds to the next requester in line. If a device far down the line of requesters in the round robin circuit has a request even though no one else has a request between the present arbitration logic circuit and the one connected to a requester requiring access to the asset, the circuit may still require one or more clocks to get to the requester having a present need to acquire the use of the asset. Therefore, overhead for the conventional round robin circuit may take more than one cycle when the service is granted from one request to another request. Furthermore, the circuit may not allow an interactive request to break in during a granted batch request if both batch request and interactive request are asserted resulting in the response time to the interactive request to become intolerable. The interactive request is an asynchronous request typically containing control information, whereas the batch request is a synchronous request typically involving sequentially accessed data.

In some cases, conventional resource allocation schemes use a priority interrupt technique where the requester with the most priority is always the next one to have access to the asset. However, with such a priority interrupt technique, a requester with low priority may have to wait an extremely long time before being granted access to an asset.

SUMMARY

In one aspect, a resource allocation arbitration system is disclosed. The system includes a plurality of storage devices, a plurality of indicators, and a plurality of mask bits. Each storage device stores requests for resources. Each indicator enables indication of a condition in which the request stored in each storage device is almost empty. Furthermore, the mask bits enable preemption of one request by another request.

In another aspect, an arbitration method is described. The method includes storing requests for allocation of resources, indicating a condition in which the stored requests are almost empty, and arbitrating the allocation of resources by providing selection bits that operate in conjunction with the indicator to substantially reduce idle time between the requests.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In recognition of the above-stated problems associated with conventional resource allocation schemes, embodiments for a modified round robin approach are described. This modified round robin approach provides equal access opportunity to all resources while enabling a substantial decrease in time to perform the round robin cycle. Consequently, for purposes of illustration and not for purposes of limitation, the exemplary embodiments are described in a manner consistent with such use, though clearly the invention is not so limited.

Figure 1:
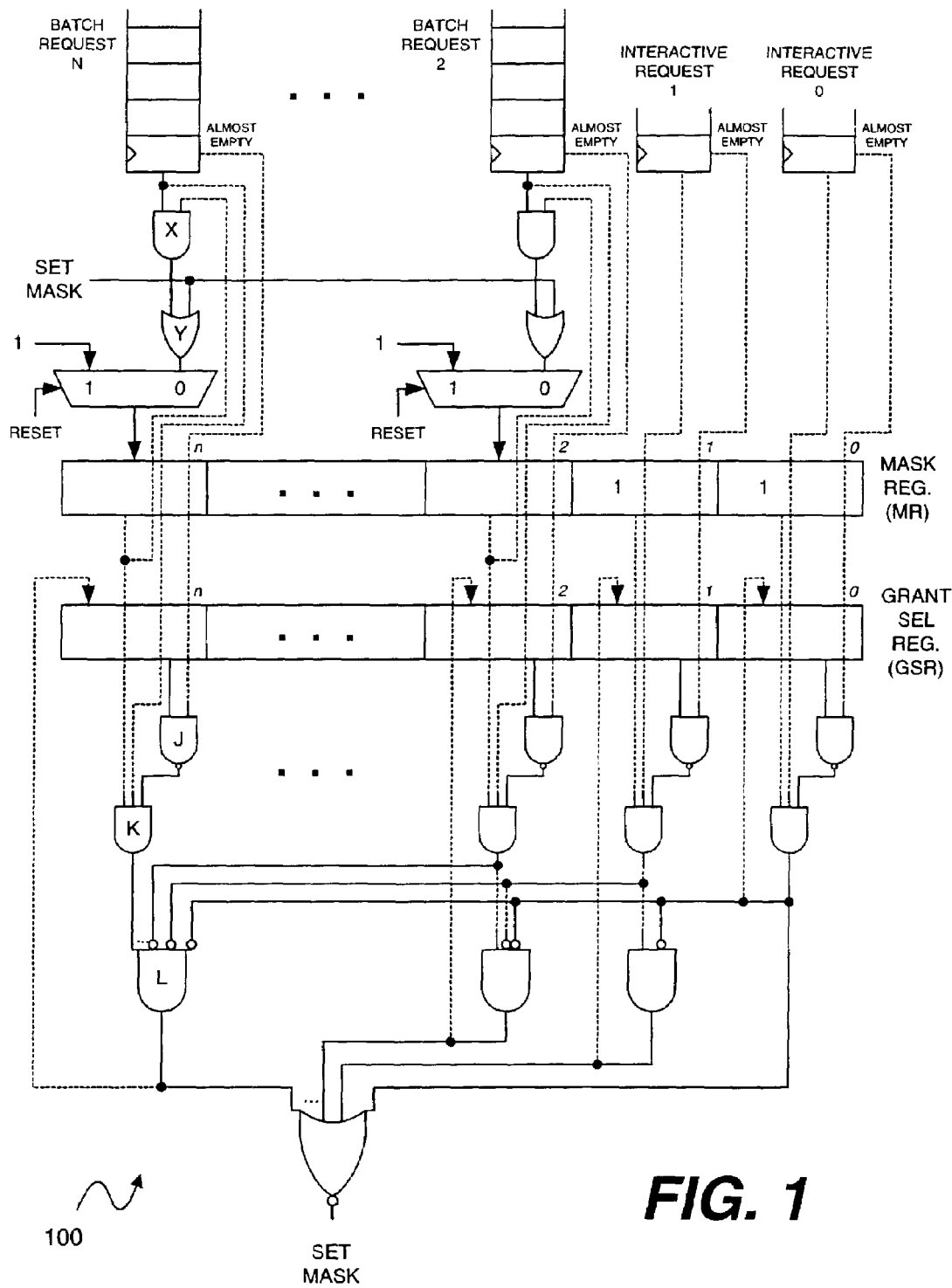
FIG. 1 illustrates one embodiment of a modified round robin configuration.

A modified round robin configuration 100 according to an embodiment of the invention is illustrated in FIG. 1. Each request, in the round robin configuration 100, whether interactive or batch, is queued to a first-in first-out (FIFO) buffer. In the illustrated embodiment, there are N requests, some of which are interactive requests (x) and others are batch requests (N-x). As long as the FIFO buffer is not empty, information in the buffer may indicate a request.

In the illustrated embodiment, to prevent the idle gap between granting of the next request and ending of the current request, each FIFO has an ALMOST-EMPTY flag to indicate that the FIFO buffer has only one item left in the request. Hence, when the ALMOST-EMPTY flag is on, granting of the request goes to the next available request in the round robin sequence by setting a grant selection register (GSR) for the next available request. Therefore, by granting the request one sequence in advance of the depletion of items in the current request FIFO buffer, the idle gap between requests may be prevented. Furthermore, this back-to-back granting-of-request mechanism requires substantially low overhead because an existing pointer for the FIFO buffer may be used as the ALMOST-EMPTY flag. In one embodiment, each of the ALMOST-EMPTY flags is coupled to a read/write pointer.

The above-described improved granting sequence is implemented using logic gates J, K, and L to set a grant bit in the corresponding grant selection register (GSR). Thus, logic NAND gate J asserts its output (a logical 1) when either the ALMOST_EMPTY flag is not set or the current grant bit is not set. Logic AND gate K is asserted when the request is initiated and the mask bit of the corresponding mask register (MR) is set while logic gate J is asserted. Finally, logic AND gate L sets the grant bit of the corresponding grant selection register when the logic gate K is asserted but logic gates corresponding to other grant bits are not asserted. Further, as soon as the grant bit is set, the SET_MASK flag for the batch requests is de-asserted.

Figure 2:
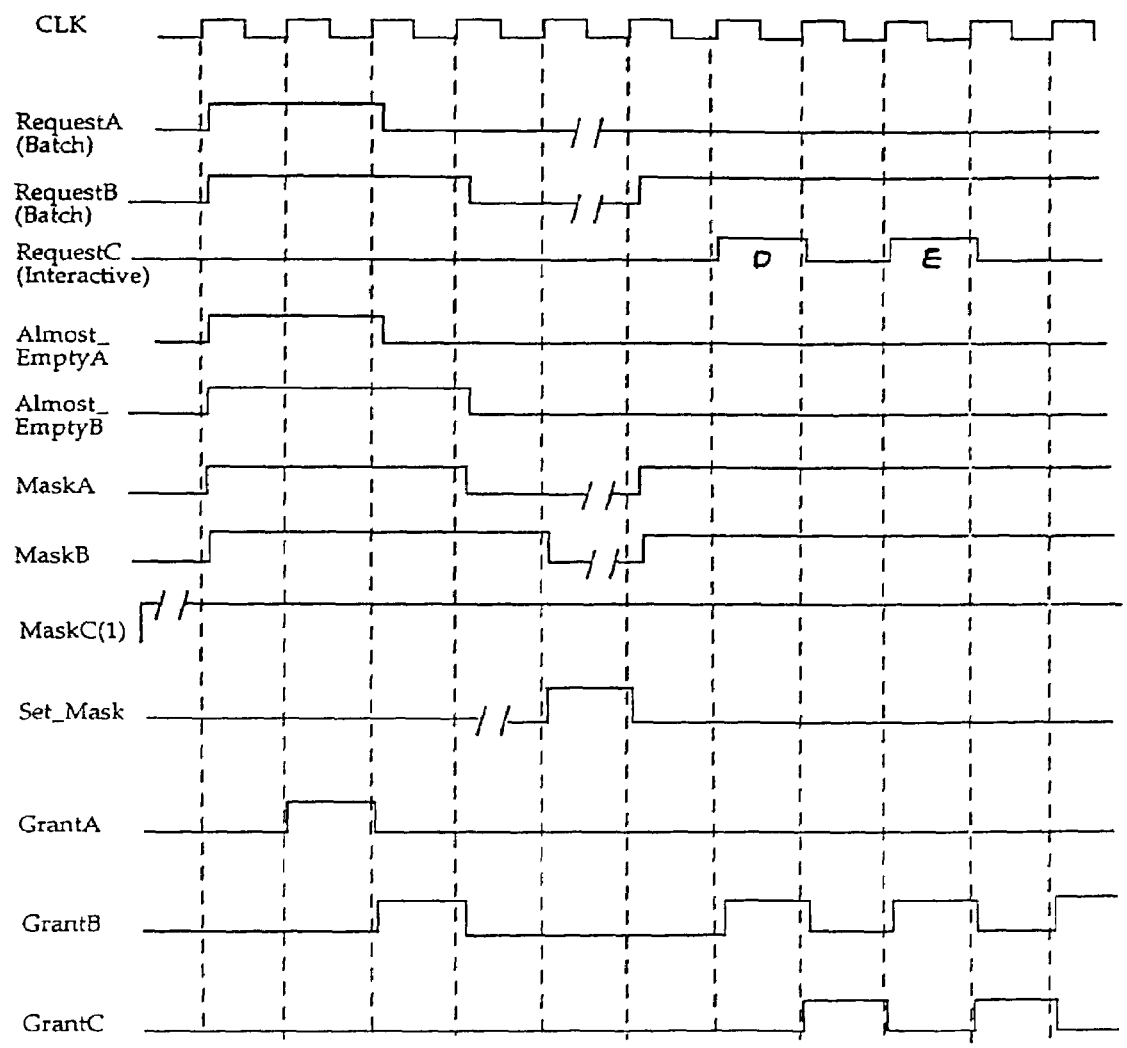
FIG. 2 is an interface timing diagram of one embodiment of a modified round robin sequence.

FIG. 2 is an interface timing diagram of a modified round robin sequence according to an embodiment of the invention. The sequence has three resource allocation requests. The first two requests are batch requests A and B. The third request is an interactive request C having two items D and E. Signals GrantA and GrantB indicate that the service is granted to the batch request B right after the granted batch request A is completed. No idle gap is shown in the timing diagram.

Referring to FIG. 1, to allow the interactive requests to preempt the batch request, the mask bit of the currently granted batch request remains active until the request is emptied. Furthermore, the mask bit of the interactive request is implemented by permanently asserting the corresponding mask bit. Thus, the interactive request is made non-maskable. If an interactive request is made during the granted period of a batch request, the batch request is suspended until the interactive request is serviced. Once the interactive request has been serviced, the suspension of the batch request may be resumed. Therefore, the preemptive arbitration circuit not only generates a short response time but also allows the interrupted request to recover.

The above-described preemptive arbitration sequence is implemented using logic gates X and Y, and the mask register (MR). For this sequence, the mask bits of the corresponding interactive requests of the mask register (MR) are set to one. The mask bits of the corresponding batch requests are controlled as follows. Logic AND gate X is asserted when the request is initiated and the mask bit of the corresponding mask register (MR) is set. Logic OR gate Y is asserted when logic gate X is asserted or when SET_MASK flag is asserted. Assertion of logic gate Y sets the corresponding mask bit of the mask register (MR) to one and allows the batch request to resume the interrupted sequence, or sets the corresponding mask bit of the MR to zero when service for the current request is done. The mask bit plus the grant priority order flows right to left with respect to FIG. 1.

GrantC signal (corresponding to the interactive request) in the interface timing diagram of FIG. 2 illustrates that the service is granted to interactive request C one cycle after item D in request C presented the request. When item D is removed, the suspended request B is resumed. When item E in request C is presented, the service is again granted to interactive request C. When item E is removed, the suspended request B is again resumed.

There has been disclosed herein embodiments for a modified round robin configuration which includes an improved granting sequence and a preemptive arbitration scheme. The improved granting sequence enables short response time to requests by substantially reducing any idle time between requests. This sequence uses an existing pointer to provide an indication of an "almost empty" buffer. The preemptive arbitration scheme allows interactive requests to preempt the batch request. Furthermore, the scheme also enables the batch request to recover from the interruption.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the invention. It will be apparent, however, to one skilled in the art that the embodiments may be practiced without some of these specific details. For example, although the improved round robin configuration of FIG. 1 uses logic gates to perform the above-described sequences, other comparable circuits and/or elements that perform similar functions may be used. In other instances, well-known structures and functions were not described in elaborate detail in order to avoid obscuring the subject matter of the invention. Accordingly, the scope and spirit of the invention should be judged in terms of the claims which follow.

What is claimed is:

1. An arbiter, comprising:
   a plurality of buffers to store requests for allocation of resources;
   a plurality of flags to indicate a condition in which each of the plurality of buffer is almost empty; and
   a plurality of selection bits to arbitrate the allocation of resources, the selection bits enhancing the arbitration by operating in conjunction with the plurality of flags to substantially reduce idle time between the requests.

2. The arbiter of claim 1, further comprising:
   a plurality of mask bits to allow preemption of one request by another request.

3. A memory allocation arbitration system, comprising:
   a plurality of first-in first-out (FIFO) buffers to store request items for memory allocation;
   a plurality of almost-empty flags, each almost-empty flag corresponding to one FIFO buffer to indicate that the buffer has only one more request item left; and
   a plurality of grant selection bits configured to operate in conjunction with the plurality of almost-empty flags to substantially reduce idle time between the requests.

4. The system of claim 3, further comprising:
   a plurality of mask bits to allow preemption of one request by another request.

5. The system of claim 3, wherein the request items include a batch request for reading data from consecutive locations in a memory.

6. The system of claim 3, wherein the request items include an interactive request for reading control information from a memory.

7. An arbitration method, comprising:
   storing requests for allocation of resources;
   indicating a condition in which the stored requests are almost empty; and
   arbitrating the allocation of resources by providing selection bits that operate in conjunction with indicating a condition to substantially reduce idle time between the requests.

8. The method of claim 7, further comprising:
   providing mask bits to allow preemption of one request by another request.

9. The method of claim 7, wherein said storing includes providing a pointer that points to a last memory location of data that is to be read out next.

10. The method of claim 9, further comprising:
    coupling said indicating a condition to said providing a pointer.

* * * * *